United States Patent [19]

Glissmann

[11] Patent Number: 4,968,503
[45] Date of Patent: Nov. 6, 1990

[54] PROCESS FOR THE PRODUCTION OF SODIUM DICHROMATE

[75] Inventor: Albert E. B. Glissmann, Langenfeld, Fed. Rep. of Germany

[73] Assignee: Bayer Aktiengesellschaft, Leverkusen, Fed. Rep. of Germany

[21] Appl. No.: 342,278

[22] Filed: Apr. 24, 1989

[30] Foreign Application Priority Data

May 5, 1988 [DE] Fed. Rep. of Germany ....... 3815240

[51] Int. Cl.$^5$ .............................................. C01G 37/14
[52] U.S. Cl. ........................................ 423/57; 423/55; 423/58; 423/597; 423/DIG. 2
[58] Field of Search ................... 423/597, DIG. 2, 55, 423/57, 58, 61, 596

[56] References Cited

U.S. PATENT DOCUMENTS

| | | | |
|---|---|---|---|
| 3,715,425 | 6/1973 | Morgan et al. | 423/607 |
| 3,784,672 | 1/1974 | Morgan | 423/202 |
| 3,932,598 | 1/1976 | Cooper et al. | 423/597 |
| 4,045,340 | 8/1977 | Perrone | 423/595 |

FOREIGN PATENT DOCUMENTS

| | | |
|---|---|---|
| 2151323 | 4/1972 | Fed. Rep. of Germany . |
| 53-39971 | 12/1978 | Japan . |
| 394316 | 3/1974 | U.S.S.R. ............. 423/597 |
| 497241 | 4/1976 | U.S.S.R. ............. 423/597 |

OTHER PUBLICATIONS

Chemical Abstract 89:114579p.

Primary Examiner—Theodore Morris
Assistant Examiner—Paige C. Harvey
Attorney, Agent, or Firm—Sprung Horn Kramer & Woods

[57] ABSTRACT

A process for the production of sodium dichromate comprising reacting sodium chromate with acids, the acids being sulfuric acid and NaHSO$_4$ formed as a waste product in the production of CrO$_3$ and thus being contaminated with chromium compounds, adding PO$_4$ ions in excess to the NaHSO$_4$ contaminated with chromium compounds and precipitating the Cr(III) present therein as CrPO$_4$ at a temperature of 50° to 100° C. and at a pH value of 3 to 6.

5 Claims, 1 Drawing Sheet

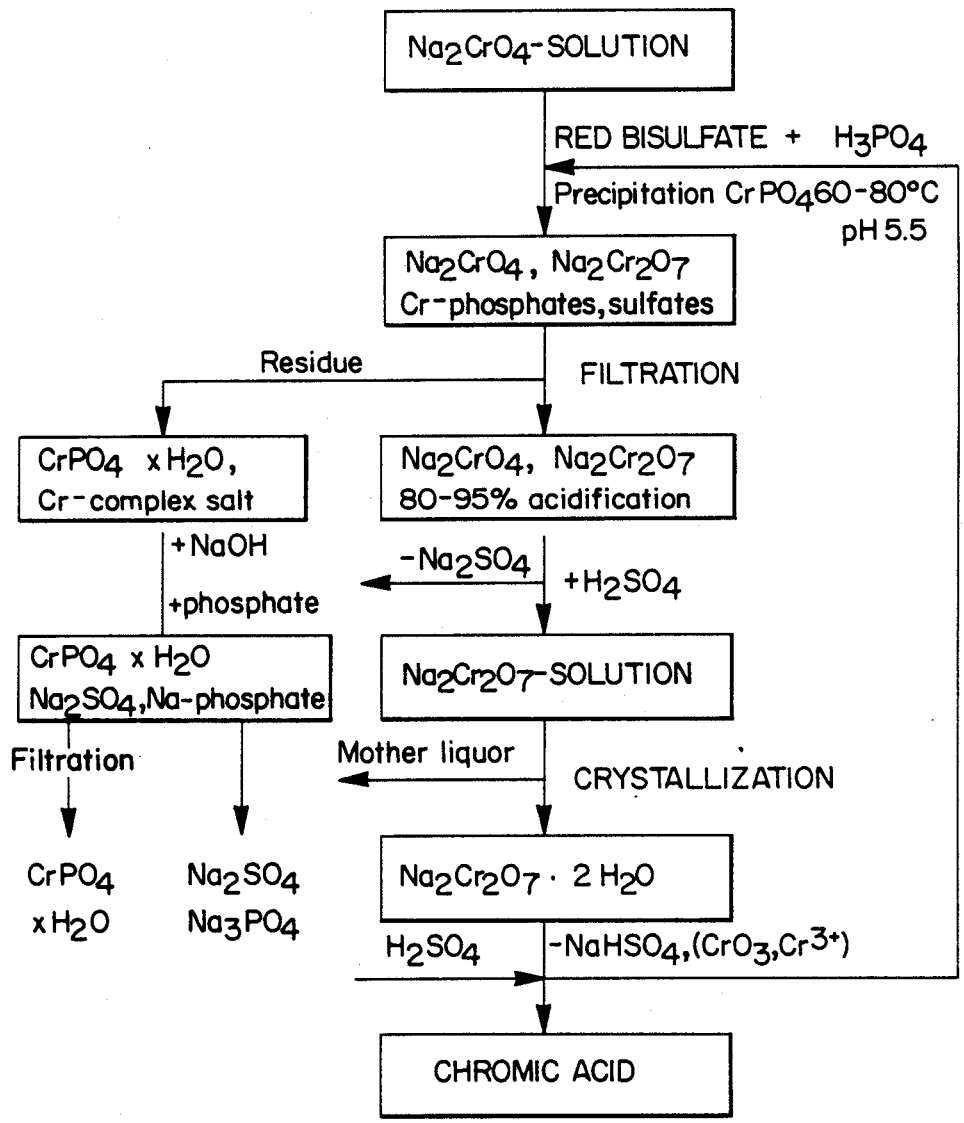

PROCESS FOR THE PRODUCTION OF SODIUM DICHROMATE

BACKGROUND OF THE INVENTION

1. Field of the Invention

This invention relates to a process for the production of Na dichromate using the sodium hydrogen sulfate melt formed in the production of chromic acid from sodium dichromate and sulfuric acid.

2. Background Information

In addition to Na hydrogen sulfate, this melt contains free sulfuric acid, chromic acid, chromium sulfate and an insoluble Na-Cr sulfate complex salt. Their respective proportions in the melt depend upon the reaction conditions used in the chromic acid production process.

The chromium contents are on average from 2.5 to 3.5% $CrO_3$ and from 0.5 to 1.5% $Cr_2O_3$. On account of the high $H_2SO_4$ content in the form of hydrogen sulfate and free sulfuric acid and the content of hexavalent chromium, attempts have repeatedly been made to use a solution of the hydrogen sulfate to acidify the monochromate solutions in the production of dichromate. However, the presence of trivalent chromium compounds leads to the formation and precipitation of Cr(III)/Cr(VI) compounds which are difficult to filter and which lead to such considerable production difficulties in the manufacture of dichromate that they are no longer used.

It is known from U.S. Pat. No. 4,045,340 that around 80% of the monochromate solutions are acidified with the waste hydrogen sulfate and that the Cr(III)/Cr(VI) compounds are separated in two stages in a boiling process. After the Cr(III)/Cr(VI) compounds have been filtered off, the filtrates are introduced into the dichromate production process free from trivalent chromium compounds. The Cr(III)/Cr(VI) compounds serve as starting material for the production of Cr(III) salts.

According to U.S. Pat. Nos. 3,715,425 and 3,784,672, a bisulfate solution substantially free from trivalent chromium and suitable for acidification of the monochromate solution is obtained by reaction of the bisulfate solution with persulfate anions and heating to 60° to 120° C. The persulfate anions were prepared by anionic oxidation of bisulfate solution on platinum anodes. However, this process is very expensive.

SUMMARY OF THE INVENTION

It has now been found that an Na hydrogen sulfate solution suitable for the acidification of monochromate solution may readily be obtained by adding phosphate ions to it in a quantity sufficient for the formation of trivalent chromium phosphate.

The present invention relates to a process for the production of Na dichromate by reaction of Na chromate with acids, characterized in that, in addition to sulfuric acid, $NaHSO_4$ formed as waste product in the production of $CrO_3$ is additionally used as acid, $PO_4$ ions being added in excess to the $NaHSO_4$ contaminated with Cr compounds and the Cr(III) present therein being precipitated as $CrPO_4$ at temperatures of 50° to 100° C. and a pH values of 3 to 6.

Through this addition of phosphate, a solution of Na hydrogen sulfate may surprisingly be directly used for the acidification of monochromate solutions. The trivalent chromium present in the hydrogen sulfate is completely precipitated as chromium phosphate with a water content of 4 to 6 mol $H_2O$.

There is no need for preliminary separation of the insoluble Na—Cr sulfate complex salt present in the Na hydrogen sulfate because the small quantities of trivalent chromium which pass into solution through hydrolysis are immediately precipitated as chromium phosphate. The Na—Cr complex salt is slowly transformed into chromium phosphate.

Precipitation of the chromium phosphate takes place at a pH value in the range from 3 to 6 and preferably in the range from 4.5 to 5.6. So far as the filterability of the precipitate is concerned, the best results are obtained at pH values of 5.3 to 5.6, corresponding to 80 to 95% acidification of the monochromate. Precipitation proceeds particularly favorably when the excess of phosphate ions is greater than or equal to 10%.

After the precipitate consisting of Cr phosphate and the remainder of the Na—Cr sulfate complex salt has been filtered off, clear 80 to 95% acidified dichromate solution free from trivalent chromium compounds is obtained. The trivalent chromium compounds are returned for further processing to the dichromate production process.

To remove the Na—Cr sulfate present, the filter cake may be treated with NaOH in the presence of phosphate ions at a pH value in the range from 8 to 10. Complete conversion to Cr phosphate is obtained.

The chromium in the Cr phosphate obtained may be converted in known manner into monochromate solution by oxidizing digestion in alkaline medium.

The following substances for example may be used as the phosphate ion source: $H_3PO_4$, $Na_2HPO_4$ and $NaH_2PO_4$.

The process according to the invention is generally carried out as follows:

Sodium hydrogen sulfate melt from the production of chromic acid, which contains on average 2.5 to 3.5% $CrO_3$ and proportions of trivalent chromium (0.5 to 1.5%, expressed as $Cr_2O_3$), is adjusted with water to a density of approximately 1.3 kg/$dm^3$. Corresponding to the Cr(III) content, phosphoric acid is added in an excess of at least 10% and the resulting solution used for partial acidification of monochromate solutions. The temperature of the process is between 60° and 80° C. while the pH value is best between about 4.5 and 5.6. The deposit precipitated in this pH range, which consists essentially of chromium phosphate, is filtered while still hot and the filtrate free from Cr(III) ions is set aside for further use in the dichromate process.

BRIEF DESCRIPTION OF THE DRAWING

One particular embodiment of the process according to the invention is shown in the accompanying flow chart (FIG. 1).

DETAILED DESCRIPTION OF THE INVENTION

The process according to the invention is further illustrated by the following examples where percentages represent percentages by weight, unless otherwise stated.

EXAMPLE 1

1 kg Na hydrogen sulfate melt is dissolved in 1500 ml water (specific gravity 1.3). Corresponding to the $Cr_2O_3$ content of the Na hydrogen sulfate melt of 1%

$Cr_2O_3$, 14.3 g $H_3PO_4$ are added to the solution, corresponding to an excess of 10%.

Monochromate solution is acidified with this solution to pH 5.4 at a temperature of 60° C.

The trivalent chromium precipitates from the initially dark solution in the form of chromium phosphate containing 4 to 6 mol water of crystallisation.

The precipitate is filtered while still hot. The $Cr_2O_3$ content comprises 26%. The filtrate does not contain any trivalent chromium.

EXAMPLE 2

Dependence of the filtration rate on the pH value:

Quantities of 500 ml monochromate solution are acidified to various pH values with a solution of Na hydrogen sulfate, specific gravity 1.3, to which 17 g $H_3PO_4$ has been added per kg hydrogen sulfate (10% excess, based on the quantity of Cr(III)).

The solutions are heated to 80° C. and the filtration time measured.

| Monochromate | $NaHSO_4$ + $H_3PO_4$ | pH | Filtration time |
|---|---|---|---|
| 500 ml | 210 ml | 6.5 | 15 minutes |
| 500 ml | 258 ml | 6.0 | 9.7 minutes |
| 500 ml | 273 ml | 5.5 | 2.1 minutes |
| 500 ml | 283 ml | 5.23 | 3 minutes |
| 500 ml | 286 ml | 4.7 | 8 minutes |

The most favorable filtration times are at the pH values of 5.5 and 5.23, which corresponds to 90 to 95% acidification.

EXAMPLE 3

Behavior of the Na—Cr sulfate complex salt present in the Na hydrogen sulfate on addition of phosphoric acid:

Quantities of 20 g of the Na—Cr sulfate complex salt are suspended in 400 ml water, followed by addition of 4 ml $H_3PO_4$ (85%).

Since phosphoric acid is replaced by sulfuric acid as a weak acid during reaction of the double salt to form Cr phosphate, there is a reduction in the pH value during the reaction which can be corrected by addition of NaOH.

The addition rate of NaOH is a measure of the course of the reaction.

| pH value | Observation time | Conversion reached | g Precipitate | % $Cr_2O_3$ |
|---|---|---|---|---|
| 3.0–5.4 | 9 hours | 45% | 16.46 g | 22.6% |
| 3.3–6.2 | 6 hours | 50% | 15.34 g | 24.1% |
| 7–10 | 2 hours | 95% | 11.9 g | 31.4% |
| 10–11 | 1 hour | 100% | 12.2 g | 30.9% |

It will be appreciated that the instant specification and claims are set forth by way of illustration and not limitation, and that various modifications and changes may be made without departing from the spirit and scope of the present invention.

What is claimed is:

1. A process for the production of sodium dichromate comprising reacting
   (a) sulfuric acid and $NaHSO_4$ formed as a waste product in the production of $CrO_3$, said $NaHSO_4$ being contaminated with chromium (III) compounds, with
   (b) $PO_4$ ions, said $PO_4$ ions being in excess to the chromium (III) contained in $NaHSO_4$,
   wherein the excess of $PO_4$ ions is greater than or equal to 10% and with (c) sodium chromate at a temperature of 50° to 100° C. and at a pH value of 3 to 6 and precipitating and filtering the chromium (III) present therein as $CrPO_4$, the mother liquor thus composed of a sodium chromate and dichromate solution, which is then acidified and crystallized to form sodium dichromate.

2. A process as claimed in claim 1, wherein the $CrPO_4$ is precipitated at temperature of 60° to 80° C.

3. A process as claimed in claim 1, wherein the $CrPO_4$ is precipitated at a pH value of 4.5 to 5.5.

4. A process as claimed in claim 1, wherein the $CrPO_4$ is precipitated at a pH value of 5.3 to 5.6.

5. A process as claimed in claim 1, wherein the $PO_4$ ions are obtained from a $PO_4$ source selected from the group consisting of $H_3PO_4$, $Na_2HPO_4$ and $NaH_2PO_4$.

* * * * *